J. J. Weeks,
Mortising Machine.
N°6,350.  Patented Apr. 17, 1849.
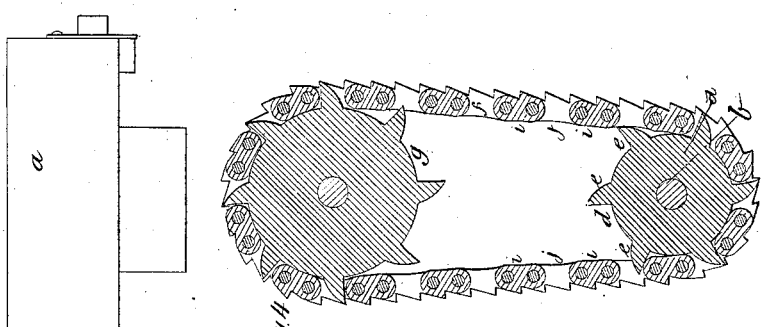
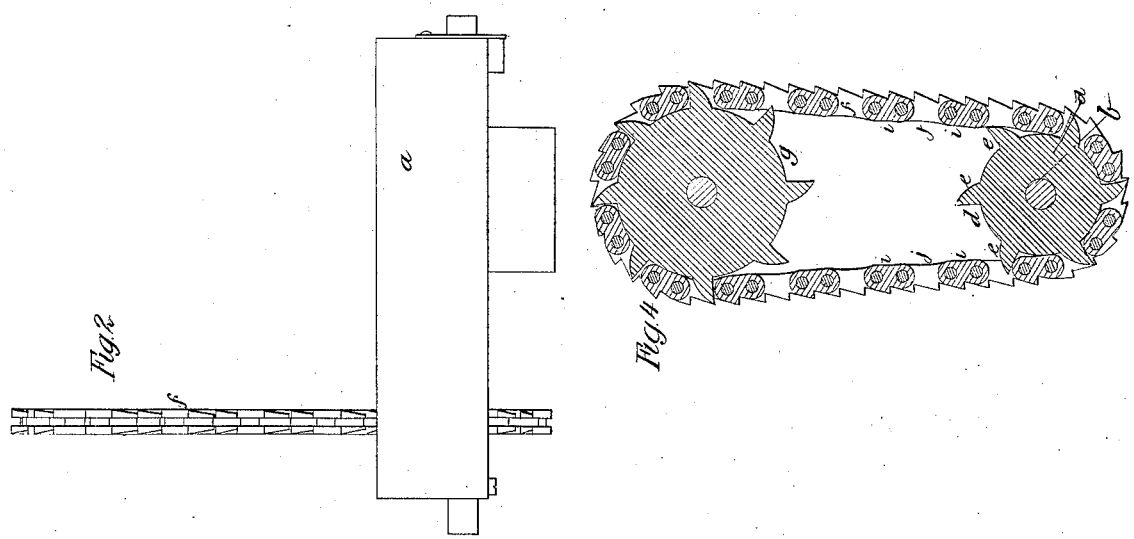
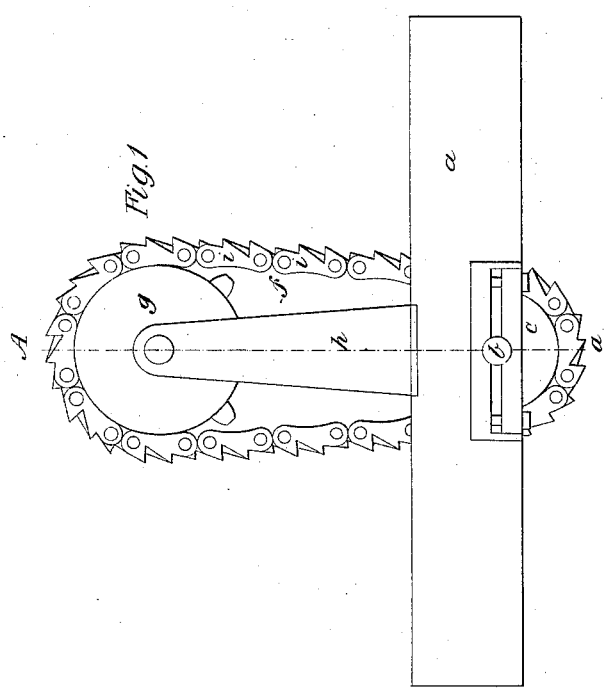
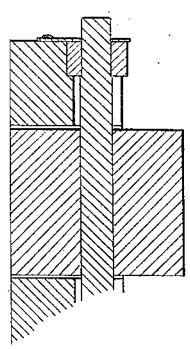
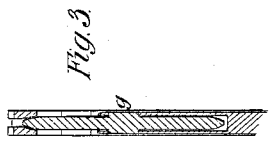

UNITED STATES PATENT OFFICE.

JOHN J. WEEKS, OF BUCKRAM, NEW YORK.

MORTISING-MACHINE.

Specification of Letters Patent No. 6,350, dated April 17, 1849.

*To all whom it may concern:*

Be it known that I, JOHN J. WEEKS, of Buckram, in the county of Queens, New York, have invented certain new and useful Improvements in the Machine for Mortising Wood, and that the following is a full, clear, and exact description of the principle or character which distinguishes it from all other things before known, and of the manner of making, constructing, and using the same, reference being had to the accompanying drawings, making part of this specification, in which—

Figure 1 is a side elevation; Fig. 2, a front elevation; Fig. 3, a vertical section taken at the line A, a, of Fig. 1, and Fig. 4 a separate section.

The same letters indicate like parts in all the figures.

The nature of my invention consists in cutting mortises in wood and other substances by means of an endless chain of cutters, (the cutters being formed in the outer edge of the chain) which passes around two wheels or drums, one of them being of less thickness than the chain, and having its bearings in thin standards so that the chain of cutters on the cutting edges thereof shall be of greater thickness than the said wheel or drum, together with its journals and standards, so that the said cutters may cut a mortise or slot or groove of greater depth than the depth of the chain and the semidiameter of the wheel around which it passes.

In the accompanying drawings (a) represents a bench which may be made of any desired form adapted to the purpose, and (b) a shaft the journals of which run in appropriate boxes in the bench, the said shaft being provided with a pulley (c) to receive a belt from some first mover, and a wheel (d) the periphery of which is provided with spurs or cogs (e) which enter the links of the chain (f) of cutters, or otherwise formed to receive and carry the said chain of cutters which passes around it and another wheel (g) of the same or greater diameter, the periphery of which should also be provided with spurs or cogs (e) to enter the links of the chain, mainly to prevent the said chain from slipping off, as the said wheel must be made of less thickness than the chain. The journals of this wheel run in holes made near the ends of two standards (h, h) properly secured to the bench, and made so thin that they together with the wheel shall freely pass into the mortise or gain cut by the cutters on the chain. Either the standards or the boxes in which the journals of the main shaft (b) may be made adjustable to the length of the chain or to draw it tight after it has been put on the wheels.

The chain is formed of a series of links (i, i) and (j), the links (i, i) which are double embracing the links (j) which are single, so that there will be alternately a double and a single link. These are jointed together by joint pins in the usual manner of making such chains, and when put on the wheels the cogs or spurs of such wheels will enter the spaces between the double links for the purpose of carrying the chain. The outer edges of the links are formed with cutting or chisel edges (k), so that the space left in the middle between the cutters of the double links will be cut out by the cutters of the single links. The cutting edges may be made in any desired form to suit the fancy or judgment of the constructor, or the material to be operated upon.

The material to be either mortised or grooved may be presented to the operation of the cutters in any desired manner either by hand or by a carriage and as this makes no part of my invention it is not deemed necessary to give a description or representation of the various modes in which the material may be applied particularly as any of the modes known to machinists of effecting such purposes may be employed.

I contemplate sometimes making the cogs of the wheel (g) of sufficient length to pass entirely through the chain and to give to their outer ends a chisel form to aid in cutting, as represented in the additional Fig. 4.

What I claim as my invention and desire to secure by Letters Patent is—

The employment of an endless chain of cutters for cutting mortise grooves, &c., the cutters being formed on the outer edges of the links, substantially as described in combination with the wheel (*g*) around which the chain passes, and which is mounted on their standards so that the wheel and standards shall be of less thickness or width, than the whole width of the cutting edges, substantially as described, whereby a mortise, groove, or gain may be cut by a continuous rotary motion of greater depth than is due to the depth of the chain and the semidiameter of the wheel around which the chain passes as described.

JOHN J. WEEKS.

Witnesses:
WM. S. McCANN,
ALLEN MAROXHURST.